(12) United States Patent
Yamashita et al.

(10) Patent No.: US 6,197,090 B1
(45) Date of Patent: Mar. 6, 2001

(54) METHOD AND APPARATUS FOR RECOVERING A GAS FROM A GAS MIXTURE

(75) Inventors: Naohiko Yamashita; Takao Yamamoto, both of Hyogo-ken (JP)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/356,709

(22) Filed: Jul. 20, 1999

(30) Foreign Application Priority Data

Jul. 22, 1998 (JP) .................................................. 10-206282

(51) Int. Cl.[7] .................................................. B01D 53/22
(52) U.S. Cl. .................... 95/12; 95/22; 95/45; 95/55; 96/4; 96/9; 96/397; 96/417; 96/421
(58) Field of Search ............................... 95/8, 12, 19, 22, 95/45, 47–55; 96/4, 7–14, 397, 417, 421

(56) References Cited

U.S. PATENT DOCUMENTS

| | | | |
|---|---|---|---|
| 4,119,417 | * 10/1978 | Heki et al. .............................. | 96/8 X |
| 4,140,499 | * 2/1979 | Ozaki et al. ............................ | 96/8 X |
| 4,264,338 | * 4/1981 | Null ..................................... | 95/49 X |
| 4,421,529 | * 12/1983 | Revak et al. ............................ | 95/54 |
| 4,806,132 | * 2/1989 | Campbell ............................... | 95/12 |
| 4,857,082 | * 8/1989 | DiMartino, Sr. et al. ............... | 95/19 |
| 4,931,070 | * 6/1990 | Prasad .................................... | 96/9 X |
| 5,053,058 | * 10/1991 | Mitariten ................................ | 96/8 |
| 5,102,432 | * 4/1992 | Prasad .................................... | 95/54 |
| 5,169,412 | * 12/1992 | Prasad et al. .......................... | 95/47 |
| 5,259,869 | * 11/1993 | Auvil et al. ............................ | 95/52 |
| 5,281,253 | * 1/1994 | Thompson .............................. | 95/22 |
| 5,378,263 | * 1/1995 | Prasad .................................... | 95/45 X |
| 5,482,539 | * 1/1996 | Callahan ................................ | 95/45 X |
| 5,507,855 | * 4/1996 | Barry ...................................... | 95/22 X |
| 5,611,845 | 3/1997 | Delp, II .................................. | 96/4 |
| 5,669,959 | * 9/1997 | Doshi et al. ............................ | 95/51 |
| 5,855,647 | * 1/1999 | Li et al. .................................. | 95/51 X |

FOREIGN PATENT DOCUMENTS 2 005 152   4/1979  (GB).

* cited by examiner

*Primary Examiner*—Robert H. Spitzer
(74) *Attorney, Agent, or Firm*—Oblon, Spivak, McClelland, Maier & Neustadt, P.C.

(57) ABSTRACT

An object of the present invention is to provide a method for recovering a gas using a semipermeable membrane in an apparatus having a simple structure. The method is capable of maintaining a purity of a product gas at a constant value even if a feed amount of a feed stream is fluctuated. A feed stream G1 is a gas mixture of a fast gas having a relatively high permeability to a membrane 1 and a slow gas having a relatively low permeability to the membrane 1. The feed stream G1 is pressurized by a compressor 3 and fed to a membrane 1 separation unit 2 having the membrane 1. Part G7 of the permeate stream on the permeate side of the membrane 1 is recirculated to the upstream side of the compressor 3 through the first recirculation line 17 and merged into a stream of the feed stream G1. Simultaneously, another part of the permeate stream G2 on the permeate side of the membrane 1 is recovered through a product gas recovering line 5. In this manner, a product gas G3 having a fast gas increased in concentration is obtained.

13 Claims, 3 Drawing Sheets

METHOD AND APPARATUS FOR RECOVERING A GAS FROM A GAS MIXTURE

BACKGROUND OF THE INVENTION

The present invention relates to a method for separating a target gas from a gas mixture by using a semipermeable membrane. The method of the present invention is suitably applied to a case where a feed amount of a starting gas mixture changes. Furthermore, the method of the present invention is effectively used in a case where a composition of the starting gas mixture fluctuates.

The term "gas mixture" used herein refers to a mixture of a relatively permeable gas ("fast gas") and a relatively impermeable gas ("slow gas"). The term "fast gas" refers to a gas having a relatively high permeability to a semipermeable membrane. The term "slow gas" refers to a gas having a relatively low permeability to the membrane. The "recovering a gas" used herein, in most cases, refers to recovering of the fast gas from the gas mixture at an increased concentration.

When a target constituent gas is recovered from a gas mixture, a semipermeable membrane having a selectivity to the target gas is used. The gas recovery process using a semipermeable membrane has been widely employed in various fields.

Principles of the gas recovery process using the membrane are summarized as follows:

(a) A semipermeable membrane (hereinafter, simply referred to as "membrane") having a selectivity to a specific gas contained in the gas mixture is used for gas-separation.

(b) The feed stream (gas mixture) is fed to one of the sides of the membrane provided within a membrane separation unit, and a permeate stream is recovered from the other side. The side to which the feed stream is fed is called "feed side". The opposite side is called "permeate side". When the feed stream is pressurized and fed to the feed side while maintaining the pressure of the feed side higher than that of the permeate side, the feed stream is separated into a permeate stream which emerges at the permeate side through the membrane and a residue stream which remains on the feed side.

Each of individual constituent gases is driven to permeate through the membrane by a difference between a partial pressure of the feed side (given by multiplying an entire pressure of the feed stream on the feed side by a mole fraction of each constituent gas) and a partial pressure of the permeate side (given by multiplying an entire pressure of the permeate stream on the permeate side by a mole fraction of each constituent gas). The amount of each constituent gas permeated is proportional to a value given by multiplying the difference in the partial pressure by a membrane size (area) and a permeability to the membrane. As a result, the fast gas is enriched in the permeate stream and the slow gas is enriched in the residue stream.

Figure 5:
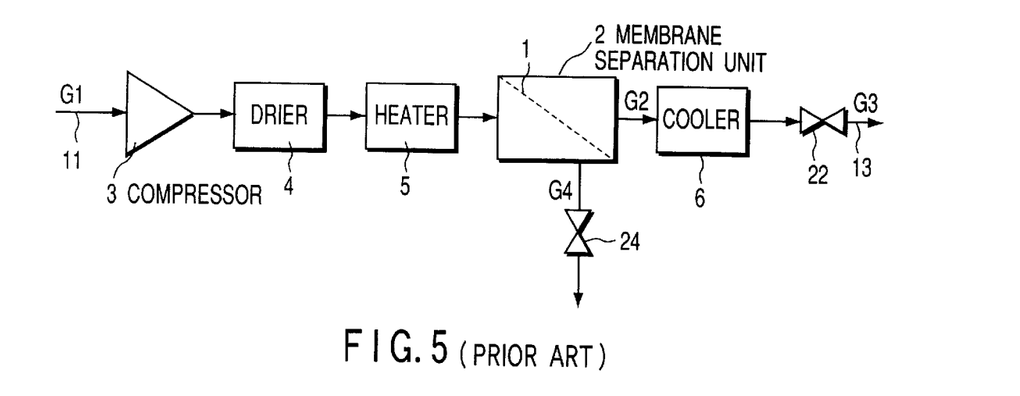
FIG. 5 is a block diagram showing a single-stage gas recovering system conventionally used.

FIG. 5 shows a basic structure of a gas recovering system using a membrane. This system is a single-stage type.

A membrane 1 is provided in a membrane separation unit 2. The membrane separation unit 2 is divided into a feed side and a permeate side by the membrane 1. A feed stream G1 is fed to the system through a feed stream supply line 11, pressurized in a compressor 3, passed through a dryer 4 and a heater 5, and fed to the feed side of the membrane 1 from a feed port of the membrane separation unit 2.

In the membrane separation unit 2, a permeate stream G2 emerging on the permeate side through the membrane 1 passes through a cooler 6 and a permeate stream pressure control valve 22 and is recovered as a product gas G3 from a product gas recovering line 13. On the other hand, a residue stream G4 left on the feed side of the membrane 1 is discharged out of the system from a discharge port of the membrane separation unit 2 via a residue stream pressure control valve 24.

Figure 6:
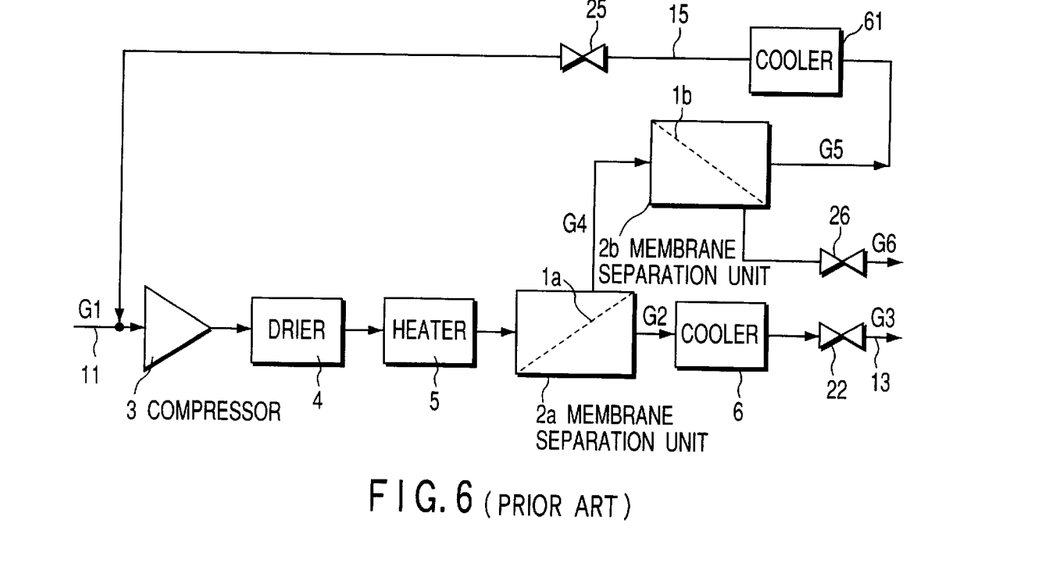
FIG. 6 is a block diagram showing a multi-stage gas recovering system conventionally used.

FIG. 6 shows a schematic structure of a gas recovering system of a multi-stage type. The multi-stage type system is widely used for the purpose of increasing a purity and a recovery rate of the product gas.

In this example, two membrane separation units (namely, first membrane separation unit 2a and second membrane separation unit 2b) are used in combination. The feed stream G1 is pressurized in the compressor 3 and fed from a feed port of a first membrane separation unit 2a to the feed side of the first membrane 1a.

The permeate stream G2 emerging on the permeate side through the first membrane 1a passes through the pressure control valve 22 on the permeate side and is recovered from the product gas recovering line 13 as the product gas G3. On the other hand, the residue stream G4 left on the feed side of the first membrane 1a is discharged from a discharge port of the first membrane separation unit 2a and sent to the second membrane separation unit 2b.

The residue stream G4 is fed from a supply port of the second membrane separation unit 2b to a feed side of the second membrane 1b. A permeate stream G5 emerging on the permeate side through the second membrane 1b, passes through a recirculation line 15 and a recirculation pressure control valve 25 and is recirculated to the upstream side of the compressor 3, and then merged into a stream of the feed stream G1. The residue stream G6 left on the feed side of the second separation membrane 1b is discharged out of the system from a discharge port of the second membrane separation unit 2b via the residue stream pressure control valve 26.

The aforementioned multi-stage type gas recovering system is called a "cascade cycle". If necessary, the apparatus may have three or more stages. In the multi-stage gas recovering system, the purity and recovery rate of a product gas can be increased by appropriately setting the size (area) of the membrane of each membrane separation unit and operating conditions (such as operation pressure, temperature) at the time the apparatus is designed, depending upon the feed amount and composition of the feed stream. Furthermore, the multi-stage type is advantageous when the residue stream is also recovered as a product, since the purity and recovery rate of the residue stream can be improved.

The gas recovering process using the aforementioned membrane may be modified depending upon the usage. In some cases, the residue stream as well as the permeate stream is recovered as a product. In other cases, only the residue stream is recovered as a product. Note that the size (area) of the membrane to be used and an operation pressure are determined depending upon a feed stream composition, required specifications and a required recovery rate of the product gas.

In the gas recovering process using the membrane mentioned above, when the feed amount of the feed stream fluctuates while other operating conditions are maintained unchanged, the concentration of a target gas contained in the product gas inevitably fluctuates. This phenomenon is generally undesirable.

For example, if the feed amount of the feed stream is lowered from a reference value while other operating conditions are maintained unchanged, the ratio of the permeate stream increases and the ratio of the residue stream decreases. Furthermore, the fast gas present in the permeate stream increases in recovery rate but decreases in concentration. On the other hand, the slow gas present in the residue stream decreases in recovery rate but increases in concentration.

This case is not preferable if the permeate stream is a target product gas to be recovered, since the concentration of the fast gas present in the product gas is meant to decrease.

In the multi-stage gas recovering system, if the feed stream is fed in a constant amount, it is possible to maintain the concentration and recovery rate of a target gas present in the product gas at the most suitable values. However, if the feed amount of the feed stream is fluctuated, the concentration of the target gas present in the product gas decreases in the same manner as in the single-stage gas recovery process.

BRIEF SUMMARY OF THE INVENTION

The present invention has been made in view of the aforementioned problems associated with the conventional methods for recovering a gas using a membrane. An object of the present invention is to provide a method for recovering a gas using a membrane in an apparatus having a simple structure. This method is capable of stabilizing a concentration of a target gas present in a product gas and maintaining a high recovery rate thereof even if a supply amount of a feed stream is reduced.

According to the method of the present invention, a target gas can be recovered from a gas mixture by the following steps:

pressurizing a feed stream, which is a gas mixture of a fast gas having a relatively high permeability to a membrane and a slow gas having a relatively low permeability to the membrane by a compressor, and feeding the feed stream pressurized to a membrane separation unit having the membrane;

recirculating part of a permeate stream on a permeate side of the membrane to an upstream side of the compressor and merging the part into a stream of the feed stream; and recovering another part of the permeate stream on the permeate side of the membrane to obtain a product gas containing the fast gas increased in concentration.

According to the aforementioned method, when a feed amount of the feed stream decreases, part of the permeate stream on the permeate side of the membrane is recirculated to merge the part into a stream of the feed stream. By virtue of this, the fast gas present on the feed side of the membrane is increased. As a result, the concentration of the fast gas present in the product gas to be recovered is stabilized.

In the aforementioned gas recovery method, preferably, the flow rate of the recirculation gas is controlled in the following manner. First, a concentration of the fast gas present in the permeate stream is measured on the permeate side of the membrane; and then, a flow rate of the part of the permeate stream to be recirculated to the upstream side of the compressor is controlled on the basis of a measured concentration value of the permeate stream, so as to maintain the fast gas concentration in the permeate stream at a constant value.

By virtue of such a control, it is possible to maintain the concentration of the fast gas in the permeate stream.

Alternatively, in the aforementioned method, the flow rate of the recirculation gas is controlled in the following manner.

First, pressure of the feed stream is measured on the upstream side of the compressor. Then, a flow rate of the part of the permeate stream to be recirculated to the upstream side of the compressor is controlled on the basis of a measured pressure value, so as to maintain the pressure of the feed stream at a constant value.

Since the feed amount on the feed side of the membrane is stabilized in such a control, the concentration of the fast gas in the permeate stream is stabilized.

Note that the control method mentioned above is effectively applied to the case where not only feed amount but also composition of the feed stream changes at a relatively high rate.

The gas recovery method mentioned above is particularly effective in the case where the fast gas is at least one selected from the group consisting of hydrogen gas and noble gases, and the slow gas is nitrogen.

In the case where the method of the present invention is applied to a two-stage process, a target gas is recovered from a gas mixture by the following steps:

pressurizing a feed stream, which is a gas mixture of a fast gas having a relatively high permeability to first and second membranes and a slow gas having a relatively low permeability to the first and second membranes, by a compressor, and feeding the feed stream pressurized to a first membrane separation unit having the first membrane;

feeding a residue stream present on a feed side of the first membrane to a second membrane separation unit having the second membrane;

recirculating part of the permeate stream on a permeate side of the first membrane to an upstream side of the compressor, to merge the part into a stream of the feed stream;

recirculating the permeate stream on a permeate side of the second membrane to the upstream side of the compressor to merge the permeate stream into the stream of the feed stream; and recovering another part of the permeate stream on the permeate side of the first membrane to obtain a product gas having a fast gas increased in concentration.

According to the aforementioned method, it is possible to stabilize the concentration of the fast gas contained in a product gas to be recovered and to increase a final recovery rate of the fast gas.

In the gas recovery method mentioned above, preferably, the flow rate of the recirculation gas is controlled by the following steps:

measuring a concentration of the fast gas in the permeate stream on the permeate side of the first membrane; and controlling a flow rate of the part of the permeate stream to be recirculated to the upstream side of the compressor on the basis of a measured concentration value of the permeate stream, so as to maintain the fast gas concentration in the permeate stream at a constant value.

Alternatively, in the gas recovery method mentioned above, the flow rate of the recirculation gas is controlled by the following steps:

measuring pressure of the feed stream on the upstream side of the compressor; and controlling a flow rate of the part of the permeate stream to be recirculated to the upstream side of the compressor on the basis of a measured pressure value of the feed stream, so as to maintain the pressure of the feed stream at a constant value.

Note that a single-stage apparatus to which the gas recovery method of the present invention is applied, has the following structural elements:

a membrane separation unit having a membrane;

a compressor for pressurizing a feed stream, which is a gas mixture of a fast gas having a high permeability to a membrane and a slow gas having a relatively low permeability to the membrane, and feeding the feed stream pressurized to the membrane separation unit;

a recirculation line for recirculating part of a permeate stream on the permeate side of the membrane to the upstream side of the compressor to merge the part into a stream of the feed stream; and a product gas recovering line for recovering another part of the permeate stream on the permeate side of the membrane as a product gas.

A two-stage apparatus to which the gas recovery method of the present invention is applied, has the following structural elements:

a first membrane separation unit having a first membrane;

a second membrane separation unit having a second membrane;

a compressor for pressurizing a feed stream, which is a gas mixture of a fast gas having relatively high permeability to the first and second membranes and a slow gas having relatively low permeability to the first and second membranes, and feeding the feed stream pressurized to the first membrane separation unit;

a residue stream purification line for sending a residue stream on the feed side of the first membrane to a second membrane separation unit;

a first recirculation line for recirculating part of the permeate stream on the permeate side of the first membrane to the upstream side of the compressor and merging the part into a stream of the feed stream;

a second recirculation line for recirculating the permeate stream on the permeate side of the second membrane to the upstream side of the compressor and merging the permeate stream into the stream of the feed stream; and a product gas recovering line for recovering another part of the permeate stream on the permeate side of the first membrane, as a product gas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, the gas recovery method based on the present invention will be explained with reference to the accompanying drawings.

EMBODIMENT 1

Figure 1:
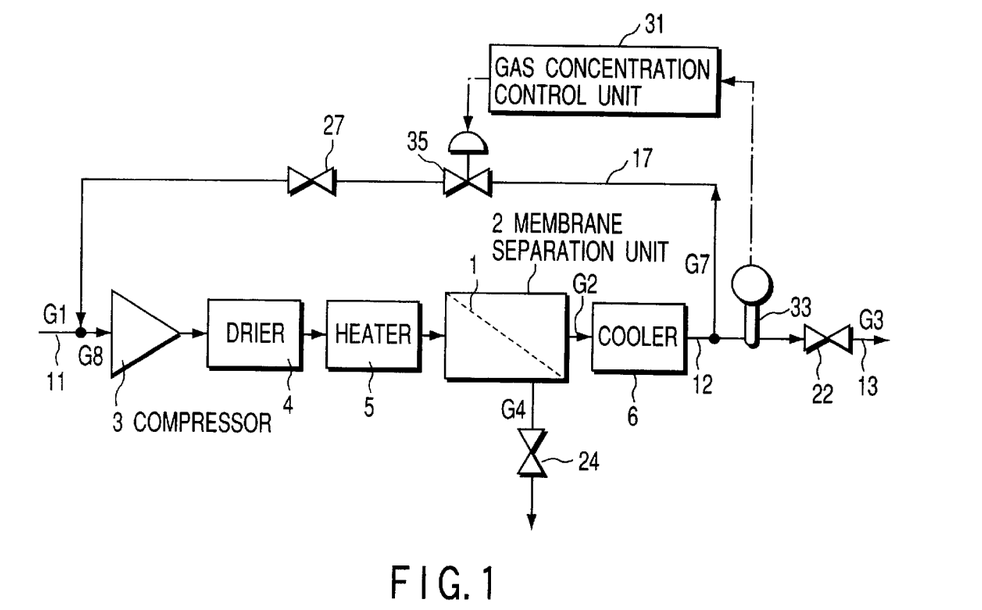
FIG. 1 is a block diagram showing an example of a single-stage gas recovering system based on the present invention.

FIG. 1 is a block diagram showing an example of a system to which the gas recovery method based on the present invention is applied. The system has a membrane 1, a membrane separation unit 2, a compressor 3, a recirculation line 17, a concentration control unit 31, a concentration sensor 33, and a control valve 35. Reference symbol G1 represents a feed stream. Reference symbols G2, G3, G4, and G7 represent a permeate stream, a product gas, a residue stream, and a recirculation gas, respectively.

The membrane 1 is provided in the membrane separation unit 2. The membrane separation unit 2 is divided into a feed side and a permeate side by the membrane 1. The feed stream G1 is introduced into this system through a feed stream supply line 11, pressurized in the compressor 3, passes through a dryer 4 and a heater 5, and fed from a feed port of the membrane separation unit 2 to a feed side of the membrane 1.

In the membrane separation unit 2, the permeate stream G2 emerging on the permeate side through the membrane 1 is recovered as the product gas G3 from a product gas recovering line 13 via a cooler 6 and a permeate stream pressure control valve 22. On the other hand, the residue stream G4 left on the feed side of the membrane 1 is discharged out of the system from a discharge port of the membrane separation unit 2 via the residue stream pressure control valve 24.

The recirculation line 17 is branched off from the middle of a line 12, which guides the permeate stream G2 from the cooler 6 to the permeate stream pressure control valve 22, and connected to the feed stream supply line 11 at the upstream side of the compressor 3. The control valve 35 and the stop valve 27 are provided in the middle of the recirculation line 17. Part of the permeate stream G2 (recirculation gas G7) passes through the recirculation line 17 and is merged into a stream of the feed stream G1 at the upstream side of the compressor 3. Furthermore, a concentration sensor 33 is provided in the middle of the line 12.

The flow rate of the recirculation gas G7 flowing through the recirculation line 17 is controlled on the basis of the output of a concentration sensor 33 in the following manner. First, using the concentration sensor 33, a concentration of the fast gas contained in the permeate stream G2 is measured. Then, the concentration control unit 31 controls the degree of opening of the control valve 35 so as to maintain the concentration of the fast gas in the permeate stream G2 at a predetermined value on the basis of the output from the concentration sensor 33.

To describe more specifically, when the concentration of the fast gas measured by the concentration sensor 33 decreases, the flow rate of the recirculation gas G7 is increased. In contrast, when the concentration of the fast gas increases, the flow rate of the recirculation gas G7 is reduced. If the flow rate is controlled in this manner, the concentration of the fast gas in the permeate stream G2 can be maintained even if a feed amount or a composition of the feed stream G1 fluctuates.

Note that, in the aforementioned method, the total of the feed amount of the feed stream G1 and the flow amount of the recirculation gas G7, is not always obtained at a constant value. Therefore, it is necessary to equip a means such as a volume control mechanism to the compressor 3. Note that in the case of a system having a feed compressor, if the feed stream is reduced, surplus capacity of the feed compressor can be used.

EMBODIMENT 2

Figure 2:
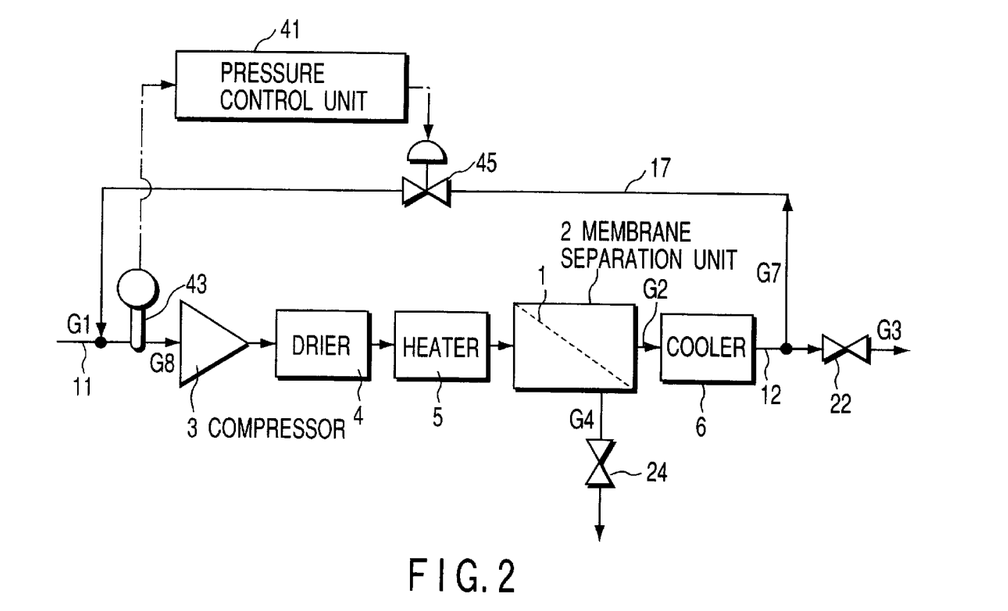
FIG. 2 is a block diagram showing another example of a single-stage gas recovering system based on the present invention.

FIG. 2 is a block diagram showing another example of a system to which the gas recovery method based on the present invention is applied. In the figure, reference numeral 41 represents a pressure control unit. Reference numerals 43 and 45 represent a pressure sensor and a control valve, respectively.

This embodiment is constituted in the same way as in the preceding embodiment (EMBODIMENT 1) except that a flow rate control method of the recirculation gas G7 flowing through the recirculation line 17 differs.

A pressure sensor 43 for measuring pressure of the feed stream G8 (after merged) is provided in the middle of the feed stream supply line 11 between a merge point of the recirculation line 17 and the compressor 3. The pressure control unit 41 controls the degree of opening of the control valve 45 on the basis of the output of the pressure sensor 43 in such a manner that the pressure of the feed stream G8 at a suction port of the compressor 3 is maintained at a predetermined value. In short, the flow rate of the recirculation gas G7 flowing through the recirculation line 17 is controlled on the basis of the output from the pressure sensor 43.

To describe more specifically, when the pressure of the feed stream G8 measured by the pressure sensor 43 is reduced, the flow rate of the recirculation gas G7 is increased. On the other hand, when the pressure of the feed stream G8 is increased, the flow rate of the recirculation gas G7 is reduced. Since the feed amount on the feed side of the membrane 1 is stabilized by virtue of such a control, the concentration of the fast gas in the permeate stream G2 can be stabilized. At the same time, the recovery rate of the fast gas can be increased.

In case of the preceding embodiment, if the feed amount and the composition of the feed stream G1 are simultaneously changed at high speeds, it is difficult to control the flow rate of the recirculation gas G7, since the control is limited by response speeds of the purity sensor 33 and the control system. This system (EMBODIMENT 2) is effectively applied to such a case.

This system is also effectively applied to the case where the compressor 3 does not have a function for controlling power in accordance with the fluctuation of the feed amount.

EMBODIMENT 3

Figure 3:
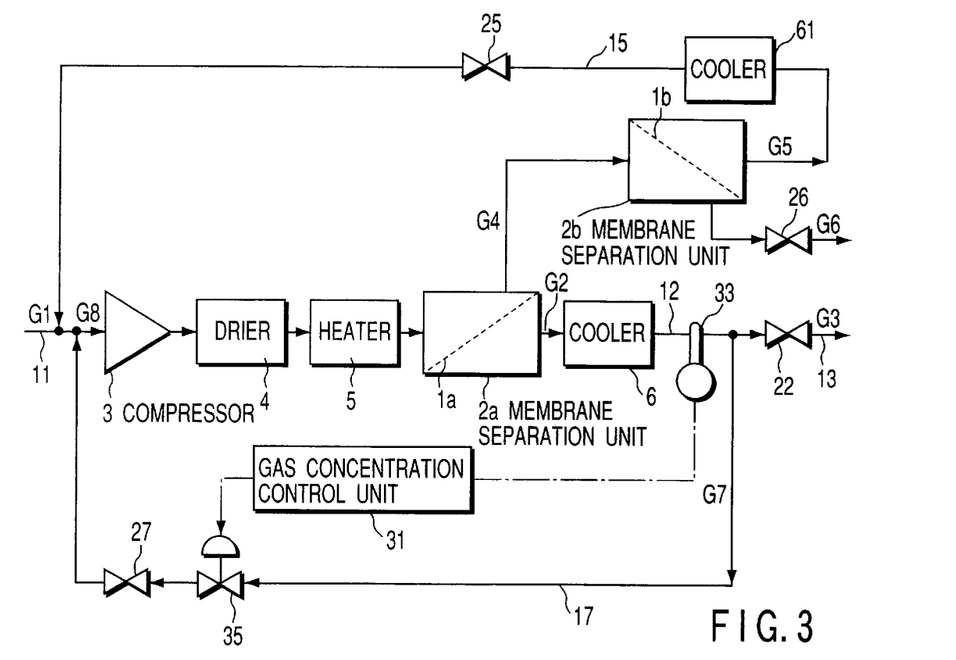
FIG. 3 is a block diagram showing an example of a multi-stage gas recovering system based on the present invention.

FIG. 3 is a block diagram showing another example of the system to which the gas recovery method based on the present invention is applied. The system comprises a first membrane 1a, a first membrane separation unit 2a, a second membrane 1b, a second membrane separation unit 2b, a first recirculation line 17, a second recirculation line 15, a concentration control unit 31, a concentration sensor 33, and a control valve 35. Reference symbols G7 and G5 represent a recirculation gas.

The system is a multi-stage gas recovering system in which two membrane separation units 2a and 2b are used in combination. The feed stream G1 is pressurized by a compressor 3 and fed from a supply port of the first membrane separation unit 2a to the feed side of the first membrane 1a.

The permeate stream G2 emerging on the permeate side through the first membrane 1a passes through a pressure control valve 22 and is recovered from a product gas recovering line 13 as a product gas G3. On the other hand, the residue stream G4 left on the feed side of the first separation membrane 1a is discharged from a discharge port of the first membrane separation unit 2a and sent to the second membrane separation unit 2b.

The residue stream G4 is fed from a supply port of the second membrane separation unit 2b to the feed side of the second separation membrane 1b. The permeate stream G5 emerging on the permeate side through the second separation membrane 1b is recirculated through a cooler G1, the second recirculation line 15 and a recirculation pressure control valve 25 to an upstream side of the compressor 3 and then merged into a stream of the feed stream G1. The residue stream G6 left on the feed side of the second membrane 1b is discharged out of the system from a discharge port of the second membrane separation unit 2b through a pressure control valve 26 on the feed side.

The first recirculation line 17 is branched from the middle of a line 12, which guides the permeate stream G2 from the first membrane separation unit 2a to the pressure control valve 22 on the permeate side, and connected to a feed stream supply line 11 on the upstream side of the compressor 3. The control valve 35 and the stop valve 27 provided in the middle of the first recirculation line 17. Part of the permeate stream G2 (recirculation gas G7) passes through the first recirculation line 17 and is merged into the stream of the feed stream G1 on the upstream side of the compressor 3. The concentration sensor 33 is further provided in the middle of the line 12.

The flow rate of the recirculation gas G7 flowing through the first recirculation line 17 is controlled by the concentration control unit 31 on the basis of the output of the concentration sensor 33 in the same manner as in the precedent embodiment (EMBODIMENT 1).

By constructing the recirculation lines 17 and 15 as mentioned above, the concentration of the fast gas in the permeate stream G2 can be maintained. Simultaneously, it is possible to increase a final recovery rate of the fast gas.

In the aforementioned method, the number of the membrane separation units and the total area of the membranes come to increase. Furthermore, the compressor 3 pressurizes not only the recirculation gas G7 from the first separation unit 2a but also the recirculation gas G5 from the second separation unit 2b. Thus, an additional capacity corresponding to the recirculation gas G5 from the second separation unit 2b is required for the compressor. As a result, whether or not the aforementioned method is employed is determined depending upon cost-versus-performance comparison.

EMBODIMENT 4

Figure 4:
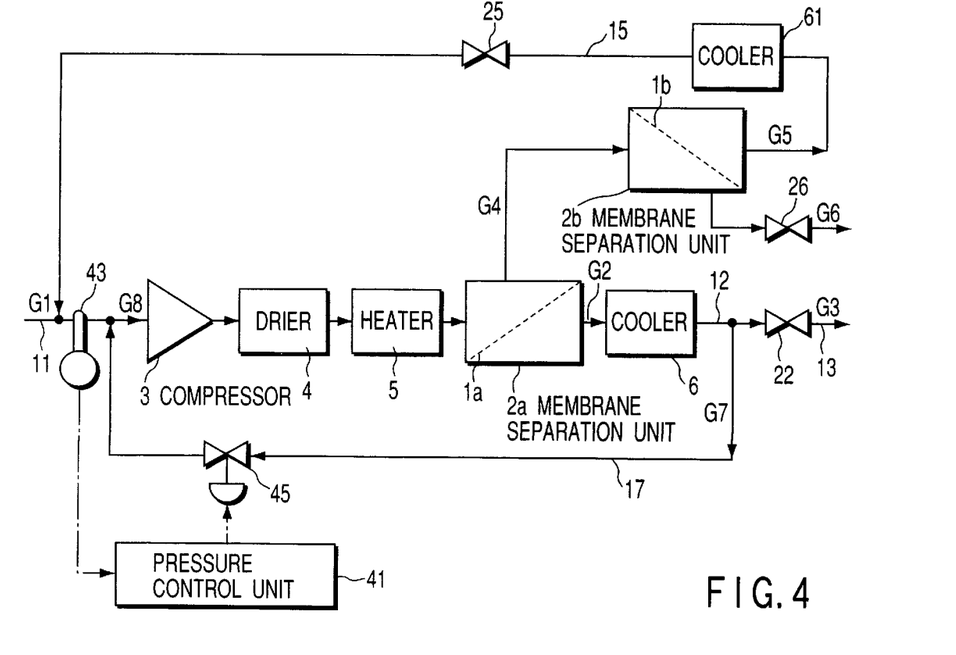
FIG. 4 is a block diagram showing another example of a multi-stage gas recovering system based on the present invention.

FIG. 4 is a block diagram of another example of the system to which the gas recovery method based on the present invention is applied. In the figure, reference numeral 41 represents a pressure control unit. Reference numerals 43 and 45 represent a pressure sensor and a control valve, respectively. Reference symbols G7 and G5 represent a recirculation gas.

This embodiment is constituted in the same way as in the precedent embodiment (EMBODIMENT 3) except that the flow rate of the recirculation gas G7 flowing through the first recirculation line 17 is controlled in a different manner.

The pressure sensor 43 for measuring pressure of the feed stream G8 (after merged) is provided in the middle of a feed stream supply line 11 between a merge point from the first recirculation line 17 and a compressor 3. The pressure control unit 41 controls the degree of opening of the control valve 45 in such a manner that the pressure of the feed stream G8 at a suction port of the compressor 3 is maintained at a predetermined value on the basis of the output of the pressure sensor 43. In short, the flow rate of the recirculation gas G7 flowing through the first recirculation line 17 is controlled on the basis of the output from the pressure sensor 43.

Since the feed amount on the feed side of the membrane 1a is stabilized by the aforementioned construction of the recirculation lines 17 and 15, the concentration of the fast gas in the permeate stream G2 is stabilized, at the same time, a final recovery rate of the fast gas can be increased.

Results of Numerical Analyses

The results of numerical analyses of gas mixture separation using the methods of the present invention (EMBODIMENTS 1–4) will be explained below. For comparison, the results of analyses using conventional apparatus (FIGS. 5 and 6) will be shown together.

In the following analyses, hydrogen gas was recovered from a gas mixture of hydrogen gas and nitrogen gas. The hydrogen gas used herein corresponds to the fast gas. The nitrogen gas corresponds to the slow gas. The membrane used herein is glassy polymeric membranes.

Operating conditions for the apparatus during the analyses will be shown below. Now, the operating conditions will be explained in case of EMBODIMENT 1 (FIG. 1). The basic operating conditions of EMBODIMENTS 2–4 (FIGS. 2–4) are as same as EMBODIMENT 1 where common elements are employed.

In the following analyses, the pressure (before merged with the recirculation gas) of the feed stream G1 to be fed to a system was about 0.1 bar (G). The feed stream G1 was pressurized to about 9.2 bar (G) by the compressor 3 after merged with the recirculation gas G7. The pressurized feed stream was subjected to the dryer 4 to remove a moisture content, further raised in temperature by the heater 5, and then introduced into the membrane separation unit 2.

The pressure of the membrane separation unit 2 on the feed side was about 9.2 bar (G) as mentioned above. The pressure on the permeate side was about 0.8 bar (G). The permeate stream G2 emerging on the permeate side through the membrane 1 was cooled to a predetermined temperature by the cooler 6. Part of the permeated gas G2, namely, the recirculation gas G7, was recirculated to the upstream side of the compressor 3 by way of the first recirculation line 17 and the control valve 35.

Another part of the permeate stream G2, namely, a product gas G3, was recovered at a pressure of about 0.7 bar (G) through the pressure control valve 22 on the permeate side and the product gas recovering line 13. On the other hand, the residue stream G4 on the feed side was discharged out of the system through the pressure control valve 14 on the feed side.

In this analysis, the concentration of hydrogen gas in the product gas G3 (hereinafter, sometimes referred to as "purity" of the product gas depending on the context), an amount of the product gas G3, and a recovery rate of the hydrogen gas, were measured by changing the feed amount of the feed stream G1. Note that other basic conditions during the analysis are as follows:

Feed stream flow rate:
changed from 400 $Nm^3/h$ to 240 $Nm^3/h$
Feed stream composition:
hydrogen gas: 80 mole %
nitrogen gas: 20 mole %
Required purity of product gas:
hydrogen gas: $\geq$98 mole %
Capacity of compressor:
400 $Nm^3/h$ (max)
Pressure on feed side of a membrane:
about 9.2 bar (G)
Pressure on permeate side of a membrane:
about 0.8 bar (G)
Note that the size (area) of the membrane was set at a sufficient value to secure a certain purity of the product gas G3 when the flow rate of the product gas G1 shows a maximum value.

Analysis 1: Comparative Example

For comparison, a feed stream was purified by using the conventional single-stage gas separation system shown in FIG. 5. The results are shown in Table 1.

In this case, if the feed amount of the feed stream was decreased, the recovery rate of the hydrogen gas was increased. This is general character of gas separation by use of membrane. However, the purity of the product gas did not satisfy the required value.

TABLE 1

| Feed stream | | | |
|---|---|---|---|
| Flow rate ($Nm^3/h$) | 400 | 320 | 240 |
| Ratio to reference flow rate (%) | 100 | 80 | 60 |
| $H_2$ (mole %) | 80 | 80 | 80 |
| $N_2$ (mole %) | 20 | 20 | 20 |
| Product gas | | | |
| Flow rate ($Nm^3/h$) | 307.3 | 252.9 | 195.2 |
| $H_2$ (mole %) | 98.00 | 97.29 | 96.09 |
| $N_2$ (mole %) | 2.00 | 2.71 | 3.91 |
| $H_2$ recovery rate (%) | 94.10 | 96.13 | 97.72 |

Analysis 2

A feed stream was purified by using the apparatus shown in EMBODIMENT 1 (FIG. 1) and setting a required concentration of hydrogen gas in the product gas at 98 mole %. The results are shown in Table 2.

When a feed amount of the product gas was reduced, as the result that part of the permeate stream was recirculated, the amount of the product gas and the recovery rate of hydrogen gas were low compared to the case of Analysis 1 (Comparative Example). However, even if the amount of the feed stream was drastically reduced (60%, 40%), it was possible to maintain the purity of the product gas at a constant value, and to increase the recovery rate of hydrogen gas. This is because the purity of the gas to be recirculated is higher than that of the feed stream, so that the purity of the gas on the feed side of the membrane separation unit is increased.

TABLE 2

| Feed stream | | | |
|---|---|---|---|
| Flow rate (Nm³/h) | 400 | 320 | 240 |
| Recirculation gas | | | |
| Flow rate (Nm³/h) | | 59.3 | 120.3 |
| Product gas | | | |
| Flow rate (Nm³/h) | 307.3 | 248.7 | 188.8 |
| H₂ (mole %) | 98.00 | 98.00 | 98.00 |
| N₂ (mole %) | 2.00 | 2.00 | 2.00 |
| H₂ recovery rate (%) | 94.10 | 95.19 | 96.35 |

Analysis 3

A feed stream was purified by using the apparatus shown in FIG. 2 (EMBODIMENT 2) and setting a required pressure of the feed stream on the upstream side of the compressor at 0.1 bar (G). The results are shown in Table 3.

When a feed amount of the feed stream was reduced, as the result that part of the permeate stream was recirculated, an amount of the product gas and a recovery rate of hydrogen gas were low compared to the case of Analysis 2 (EMBODIMENT 1). However, even if the amount of the feed stream was drastically reduced (80%, 60%), it was possible to maintain a purity of the product gas at no less than a required value. This is because the purity of the recirculation gas is higher than that of the feed stream, so that purity of the gas present on the feed side of the membrane separation unit is increased.

TABLE 3

| Feed stream | | | |
|---|---|---|---|
| Flow rate (Nm³/h) | 400 | 320 | 240 |
| Recirculation gas | | | |
| Flow rate (Nm³/h) | | 80 | 160 |
| Product gas | | | |
| Flow rate (Nm³/h) | 307.3 | 247.0 | 187.0 |
| H₂ (mole %) | 98.00 | 98.19 | 98.36 |
| N₂ (mole %) | 2.00 | 1.81 | 1.64 |
| H₂ recovery rate (%) | 94.10 | 94.75 | 95.78 |

Analysis 4: Comparative Example

A feed stream was purified by using the conventional multi-stage gas separation system shown in FIG. 6, for comparison. The results are shown in Table 4.

As is the same way as in Analysis 1, when a feed amount of the feed stream is decreased in this method, a recovery rate of hydrogen gas increases. However, the purity of the product gas does not satisfy the required value. As a matter of course, the hydrogen gas recovery rate is increased at a higher rate in the multi-stage system (Analysis 4) than in the single-stage system (Analysis 1).

TABLE 4

| Feed stream | | | |
|---|---|---|---|
| Flow rate (Nm³/h) | 400 | 320 | 240 |
| Ratio to reference | 100 | 80 | 60 |

TABLE 4-continued

| flow rate (%) | | | |
|---|---|---|---|
| H₂ (mole %) | 80 | 80 | 80 |
| N₂ (mole %) | 20 | 20 | 20 |
| Product gas | | | |
| Flow rate (Nm³/h) | 316.1 | 257.6 | 197.5 |
| H₂ (mole %) | 98.00 | 97.25 | 96.01 |
| N₂ (mole %) | 2.00 | 2.75 | 3.99 |
| H₂ recovery rate (%) | 96.82 | 97.85 | 98.76 |

Analysis 5

A feed stream was purified by using the apparatus shown in FIG. 3 (EMBODIMENT 3) and setting a required concentration of hydrogen gas present in the product gas at 98 mole %. In addition, the size (area) of the first membrane was set at 103% of the size in Analyses 1–3, and the size (area) of the second membrane was set at as same as in Analysis 1–3. The results are shown in Table 5.

According to this method, it was possible to maintain a purity of the product gas at a constant value even if a feed amount of the feed stream was drastically reduced (80%, 60%). In addition, according to this method, the recovery rate of the hydrogen gas was higher than in the single-stage system (Analysis 2, FIG. 2).

TABLE 5

| Feed stream | | | |
|---|---|---|---|
| Flow rate (Nm³/h) | 400 | 320 | 240 |
| Recirculation gas | | | |
| Flow rate (Nm³/h) | | 62.5 | 125.7 |
| Product gas | | | |
| Flow rate (Nm³/h) | 316.1 | 254.6 | 192.2 |
| H₂ (mole %) | 98.00 | 98.00 | 98.00 |
| N₂ (mole %) | 2.00 | 2.00 | 2.00 |
| H₂ recovery rate (%) | 96.82 | 97.4 | 98.11 |

Analysis 6

A feed stream was purified by using the apparatus shown in FIG. 4 (EMBODIMENT 4) and setting a required pressure of the feed stream on the upstream side of the compressor at 0.1 bar (G). The results are shown in Table 6.

According to this method, even if a feed amount of the feed stream was drastically reduced (80%, 60%), it was possible to maintain a purity of the product gas at no less than a required value. The recovery rate of the hydrogen gas was slightly large compared to the case of the single-stage system (Analysis 3, FIG. 3) but slightly low compared to Analysis 5.

TABLE 6

| Feed stream | | | |
|---|---|---|---|
| Flow rate (Nm³/h) | 400 | 320 | 240 |
| Recirculation gas | | | |
| Flow rate (Nm³/h) | | 82.5 | 165.2 |
| Product gas | | | |
| Flow rate (Nm³/h) | 316.1 | 253.7 | 191.2 |
| H₂ (mole %) | 98.00 | 98.19 | 98.35 |
| N₂ (mole %) | 2.00 | 1.81 | 1.65 |
| H₂ recovery rate (%) | 96.82 | 97.32 | 97.93 |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for recovering a gas from a gas mixture, comprising the steps of:

pressurizing a feed stream, which is a gas mixture of a fast gas having a relatively high permeability to a membrane and a slow gas having a relatively low permeability to the membrane by a compressor, and feeding the feed stream pressurized to a membrane separation unit having the membrane;

recirculating part of a permeate stream on a permeate side of the membrane to an upstream side of the compressor and merging the part into a stream of the feed stream;

recovering another part of the permeate stream on the permeate side of the membrane to obtain a product gas containing the fast gas increased in concentration, wherein a concentration of the fast gas present in the permeate stream is measured on the permeate side of the membrane; and a flow rate of the part of the permeate stream to be recirculated to the upstream side of the compressor is controlled on the basis of a measured concentration value of the fast gas, so as to maintain the fast gas concentration in the permeate stream at a constant value.

2. A method according to claim 2, wherein the fast gas is at least one selected from the group consisting of hydrogen gas and noble gases, and the slow gas is nitrogen.

3. A method for recovering a gas from a gas mixture, comprising the steps of:

pressurizing a feed stream, which is a gas mixture of a fast gas having a relatively high permeability to a membrane and a slow gas having a relatively low permeability to the membrane by a compressor, and feeding the feed stream pressurized to a membrane separation unit having the membrane;

recirculating part of a permeate stream on a permeate side of the membrane to an upstream side of the compressor and merging the part into a stream of the feed stream;

recovering another part of the permeate stream on the permeate side of the membrane to obtain a product gas containing the fast gas increased in concentration, wherein:

pressure of the feed stream is measured on the upstream side of the compressor; and a flow rate of the part of the permeate stream to be recirculated to the upstream side of the compressor is controlled on the basis of a measured pressure value of the feed stream, so as to maintain the pressure of the feed stream at a constant value.

4. A method according to claim 3, wherein the fast gas is at least one selected from the group consisting of hydrogen gas and noble gases, and the slow gas is nitrogen.

5. A method for recovering a gas from a gas mixture, comprising the steps of:

pressurizing a feed stream, which is a gas mixture of a fast gas having a relatively high permeability to first and second membranes and a slow gas having a relatively low permeability to the first and second membranes, by a compressor, and feeding the feed stream pressurized to a first membrane separation unit having the first membrane;

feeding a residue stream on a feed side of the first membrane to a second membrane separation unit having the second membrane;

recirculating part of a permeate stream on a permeate side of the first membrane to an upstream side of the compressor and merging the part into a stream of the feed stream;

recirculating a permeate stream on a permeate side of the second membrane to an upstream side of the compressor and merging the permeate stream into the stream of the feed stream;

recovering another part of the permeate stream on a permeate side of the first membrane to obtain a product gas having a fast gas increased in concentration, wherein:

a concentration of the fast gas in the permeate stream is measured on the permeate side of the first membrane; and a flow rate of the part of the permeate stream to be recirculated to the upstream side of the compressor is controlled on the basis of a measured concentration value of the fast gas, so as to maintain a fast gas concentration in the permeate stream at a constant value.

6. A method according to claim 5, wherein the fast gas is at least one selected from the group consisting of hydrogen gas and noble gases, and the slow gas is nitrogen.

7. A method for recovering a gas from a gas mixture, comprising the steps of:

pressurizing a feed stream, which is a gas mixture of a fast gas having a relatively high permeability to first and second membranes and a slow gas having a relatively low permeability to the first and second membranes, by a compressor, and feeding the feed stream pressurized to a first membrane separation unit having the first membrane;

feeding a residue stream on a feed side of the first membrane to a second membrane separation unit having the second membrane;

recirculating part of a permeate stream on a permeate side of the first membrane to an upstream side of the compressor and merging the part into a stream of the feed stream;

recirculating a permeate stream on a permeate side of the second membrane to an upstream side of the compressor and merging the permeate stream into the stream of the feed stream;

recovering another part of the permeate stream on a permeate side of the first membrane to obtain a product gas having a fast gas increased in concentration, wherein:

pressure of the feed stream is measured on the upstream side of the compressor; and a flow rate of the part of a permeate stream to be recirculated to the upstream side of the compressor is controlled on the basis of a measured pressure value of the feed stream, so as to maintain pressure of the feed stream at a constant value.

8. A method according to claim 7, wherein the fast gas is at least one selected from the group consisting of hydrogen gas and noble gases, and the slow gas is nitrogen.

9. An apparatus for recovering a gas from a gas mixture, comprising:

a membrane separation unit having a membrane;

a compressor for pressurizing a feed stream, which is a gas mixture of a fast gas having a high permeability to a membrane and a slow gas having a relatively low permeability to the membrane, and feeding the feed stream pressurized to the membrane separation unit;

a recirculation line for recirculating part of a permeate stream on a permeate side of the membrane to an upstream side of the compressor and merging the part into a stream of the feed stream;

a product gas recovering line for recovering another part of the permeate stream on the permeate side of the membrane as a product gas;

a concentration sensor for measuring a concentration of the fast gas in the permeate stream on the permeate side of the membrane; and a concentration control unit for controlling a flow rate of the part of a permeate stream to be recirculated to the upstream side of the compressor, so as to maintain a concentration of the permeate stream at a constant value.

10. An apparatus for recovering a gas from a gas mixture, comprising:

a membrane separation unit having a membrane;

a compressor for pressurizing a feed stream, which is a gas mixture of a fast gas having a high permeability to a membrane and a slow gas having a relatively low permeability to the membrane, and feeding the feed stream pressurized to the membrane separation unit;

a recirculation line for recirculating part of a permeate stream on a permeate side of the membrane to an upstream side of the compressor and merging the part into a stream of the feed stream;

a product gas recovering line for recovering another part of the permeate stream on the permeate side of the membrane as a product gas;

a pressure sensor for measuring pressure of the feed stream on the upstream side of the compressor; and a pressure control unit for controlling a flow rate of the part of a feed stream to be recirculated to the upstream side of the compressor on the basis of a measured pressure value of the feed stream, so as to maintain pressure of the feed stream at a constant value.

11. An apparatus for recovering a gas from a gas mixture, comprising:

a first membrane separation unit having a first membrane;

a second membrane separation unit having a second membrane;

a compressor for pressurizing a feed stream, which is a gas mixture of a fast gas having a relatively high permeability to the first and second membranes and a slow gas having a relatively low permeability to the first and second membranes, and feeding the feed stream pressurized to the first membrane separation unit;

a residue stream purification line for sending a residue stream on a feed side of the first membrane to a second membrane separation unit;

a first recirculation line for recirculating part of a permeate stream on a permeate side of the first membrane to an upstream side of the compressor and merging the part into a stream of the feed stream;

a second recirculation line for recirculating a permeate stream on a permeate side of the second membrane to the upstream side of the compressor and merging the permeate stream into a stream of the feed stream;

a product gas recovering line for recovering another part of the permeate stream on the permeate side of the first membrane, as a product gas;

a concentration sensor for measuring a concentration of the fast gas in the permeate stream on the permeate side of the first membrane; and a concentration control unit for controlling a flow rate of the part of the permeate stream to be recirculated to the upstream side of the compressor from the permeate side of the first membrane on the basis of a measured concentration value of the fast gas, so as to maintain a concentration of the permeate stream at a constant value.

12. The apparatus of claim 11, wherein the compressor has an inlet connected to a source of gas mixture including nitrogen and hydrogen.

13. An apparatus for recovering a gas from a gas mixture, comprising:

a first membrane separation unit having a first membrane;

a second membrane separation unit having a second membrane;

a compressor for pressurizing a feed stream, which is a gas mixture of a fast gas having a relatively high permeability to the first and second membranes and a slow gas having a relatively low permeability to the first and second membranes, and feeding the feed stream pressurized to the first membrane separation unit;

a residue stream purification line for sending a residue stream on a feed side of the first membrane to a second membrane separation unit;

a first recirculation line for recirculating part of a permeate stream on a permeate side of the first membrane to an upstream side of the compressor and merging the part into a stream of the feed stream;

a second recirculation line for recirculating a permeate stream on a permeate side of the second membrane to the upstream side of the compressor and merging the permeate stream into a stream of the feed stream;

a product gas recovering line for recovering another part of the permeate stream on the permeate side of the first membrane, as a product gas;

a pressure sensor for measuring pressure of the feed stream on the upstream side of the compressor; and a pressure control unit for controlling a flow rate of the part of the permeate stream to be recirculated to the upstream side of the compressor from the permeate side of the first membrane on the basis of a measured pressure value of the feed stream, so as to maintain pressure of the feed stream at a constant value.

* * * * *